(12) United States Patent
Wilder et al.

(10) Patent No.: US 9,409,759 B2
(45) Date of Patent: Aug. 9, 2016

(54) BEVERAGE DISPENSING APPARATUS WITH A CARBONATION SYSTEM

(71) Applicant: STRAUSS WATER LTD., Petach Tikva (IL)

(72) Inventors: Haim Wilder, Raanana (IL); Eyal Krystal, Kfar Saba (IL); Mordechay Meron, Herzlia (IL); Benny Gordon, Hod Hasharon (IL); Ehud Eyal, Pardes Hanna (IL)

(73) Assignee: STRAUSS WATER LTD., Petach Tikva (IL)

( * ) Notice: Subject to any disclaimer, the term of this patent is extended or adjusted under 35 U.S.C. 154(b) by 0 days.

(21) Appl. No.: 14/424,448

(22) PCT Filed: Sep. 11, 2013

(86) PCT No.: PCT/IL2013/050768
§ 371 (c)(1),
(2) Date: Apr. 6, 2015

(87) PCT Pub. No.: WO2014/041539
PCT Pub. Date: Mar. 20, 2014

(65) Prior Publication Data
US 2015/0225221 A1 Aug. 13, 2015

(30) Foreign Application Priority Data

Sep. 13, 2012 (IL) .......................................... 221929

(51) Int. Cl.
*B01F 3/04* (2006.01)
*A23L 2/00* (2006.01)
*B67D 1/00* (2006.01)
(Continued)

(52) U.S. Cl.
CPC ................. *B67D 1/0071* (2013.01); *A23L 2/00* (2013.01); *A23L 2/54* (2013.01); *A47J 31/60* (2013.01); *B01F 3/04106* (2013.01); *B01F 3/04439* (2013.01); *B01F 3/04787* (2013.01); *B01F 3/04808* (2013.01); *B67D 1/07* (2013.01); *B67D 1/1252* (2013.01); *A23V 2002/00* (2013.01); *B01F 2003/049* (2013.01); *B67D 1/008* (2013.01); *B67D 1/0075* (2013.01); *B67D 1/125* (2013.01); *B67D 2210/00013* (2013.01); *B67D 2210/00015* (2013.01)

(58) Field of Classification Search
CPC .... B01F 3/04; B01F 3/04106; B01F 3/04099; B01F 3/04787; A23L 2/00
USPC ....... 261/119.1, 121.1, DIG. 7; 426/474, 477; 99/323.1
See application file for complete search history.

(56) References Cited

U.S. PATENT DOCUMENTS 3,730,500 A 5/1973 Richards
4,304,736 A * 12/1981 McMillin .............. B01F 3/0473
222/129.1
(Continued)

FOREIGN PATENT DOCUMENTS

DE 2358591 A1 5/1975
EP 0223209 A2 5/1987
(Continued)

*Primary Examiner* — Robert A Hopkins
(74) *Attorney, Agent, or Firm* — Browdy and Neimark, PLLC

(57) ABSTRACT

The present invention concerns apparatus for on-demand preparation of carbonated beverages. The invention further concerns processes for preparing and dispensing carbonated beverages upon user-demand.

16 Claims, 16 Drawing Sheets

(51) Int. Cl.
  *B67D 1/07*  (2006.01)
  *A23L 2/54*  (2006.01)
  *A47J 31/60* (2006.01)
  *B67D 1/12*  (2006.01)

(56) References Cited

U.S. PATENT DOCUMENTS

| | | | |
|---|---|---|---|
| 5,503,659 A * | 4/1996 | Crosman | B01D 53/04 220/371 |
| 5,992,684 A | 11/1999 | Russell | |
| 6,216,913 B1 | 4/2001 | Bilskie et al. | |
| 7,114,707 B2 * | 10/2006 | Rona | B01F 3/04531 261/119.1 |
| 7,861,550 B2 | 1/2011 | Knoll et al. | |
| 7,987,769 B2 | 8/2011 | Oranski et al. | |

FOREIGN PATENT DOCUMENTS

| | | |
|---|---|---|
| EP | 0867219 A1 | 9/1998 |
| EP | 1579906 A1 | 9/2005 |
| FR | 89935 | 9/1967 |
| WO | 02081067 A2 | 10/2002 |
| WO | 03048027 A2 | 6/2003 |
| WO | 03098136 A1 | 11/2003 |
| WO | 2006092783 A2 | 9/2006 |
| WO | 2007017864 A2 | 2/2007 |
| WO | 2008026208 A2 | 3/2008 |
| WO | 2010056486 A2 | 5/2010 |
| WO | 2011030339 A2 | 3/2011 |
| WO | 2011030340 A2 | 3/2011 |
| WO | 2012110885 A1 | 8/2012 |

* cited by examiner

BEVERAGE DISPENSING APPARATUS WITH A CARBONATION SYSTEM

FIELD OF THE INVENTION

This invention relates to an apparatus for dispensing of a beverage including carbonated beverage.

BACKGROUND OF THE INVENTION

Water dispensers for providing carbonated water are known.

EP0867219 describes a device for carbonating a liquid which comprises a container in which the liquid to be carbonated is contained, closable by means of a closure, a pressure-gas container containing the gas and an adapter which is sealingly connectable to the container. The adapter comprises means for releasing overpressure disposed therewithin.

U.S. Pat. No. 5,992,684 describes a water dispenser including a housing containing a water source and a water storage tank positioned above the water source. A water line connects the water source and the water storage tank, water being transferred from the source to the tank by a vacuum pump. A tap is coupled to the water storage tank. Optionally, a carbon dioxide injection system may be provided for producing carbonated water.

WO 2003/048027 describes a beverage dispensing apparatus for a residential refrigerator, including a drink supply canister holding a plurality of valve actuators, a water supplier for selectively supplying carbonated water and non-carbonated water, a gas supplier for supplying $CO_2$ gas to carbonate the water, and a fluid director.

Other carbonated water dispensers are described in WO 2003/098136, EP1579906, WO 2006/092783 and U.S. Pat. No. 7,861,550.

REFERENCES

The following references are considered to be pertinent for the technological background of the invention:
  EP 0867219
  U.S. Pat. No. 5,992,684
  WO 2003/048027
  WO 2003/098136
  EP 1579906
  WO 2006/092783
  U.S. Pat. No. 7,861,550
  U.S. Pat. No. 7,987,769
  WO2007/017864
  WO 2008/026208
  WO 2011/030340
  WO 2011/030339

GENERAL DESCRIPTION OF THE INVENTION

The present invention provides a beverage dispensing apparatus having a carbonation sub-system that provides, upon user demand, a quantity of carbonated beverage. The invention has the purpose of providing an efficient and compact carbonation sub-system, particularly one that is incorporated in a beverage dispensing apparatus that is intended to provide drinking quantities of the beverage, e.g. water. A particular embodiment is a beverage dispensing system that is of a small size and intended for domestic use, e.g. desktop or countertop sized dispensers, which require minimization of internal components in order to allow for compactness. Examples of dispensers are such that are adapted to prepare and immediately dispense drinking-glass quantities of the beverage. The system is typically configured to provide, on demand, either carbonated or non-carbonated beverage. The carbonation sub-system is adapted to carbonate the liquid just right prior to dispensing, among others minimizing the unpleasant after-taste formed as a result of storage of carbonated liquid between its preparation and its' dispensing.

In the following description the term "liquid" will be used to relate to an aqueous liquid that enters the apparatus from a source of the liquid and is either a beverage in its final form (save of carbonation), e.g. water to be dispensed as such or as carbonated water, or may be intended to be mixed with another ingredient, e.g. an essence, liquor, syrup or a flavoring agent to be mixed with water to turn it into a final carbonated or non-carbonated beverage (i.e. a flavored drink). In the specific embodiments described below with reference to the drawings, the liquid is water and the dispensed beverage is carbonated or non-carbonated water. It is to be noted that these are non-limiting examples for the liquid and the dispensed beverage.

The term "beverage" will be used herein to relate to the beverage dispensed out of the dispensing outlet. Until dispensed the term "liquid" will be used to relate to the aqueous liquid passing through the apparatus and being treated, e.g. filtered, disinfected, heated, cooled, carbonated and/or mixed with other ingredients (e.g. a flavoring agent, an essence, a syrup, etc., for forming the final beverage; the mixing may be during the passage of the liquid within the flow system in the apparatus or typically prior to dispensing).

By one aspect, the invention provides a beverage dispensing apparatus that comprises a liquid flow system, a carbonation sub-system, a beverage dispensing outlet and a pressure-lowering utility. The liquid flow system defines a liquid flow path between a source of the liquid and a beverage dispensing outlet. The carbonation sub-system serves for impregnating the liquid with carbon dioxide ($CO_2$). The carbonation sub-system comprises a carbonation chamber linked to the liquid flow system for receiving a quantity of liquid from said source, and is associated with a source of carbon dioxide for carbonating said quantity of liquid while in said chamber. The chamber is linked to a dispensing outlet. The chamber is further associated with a pressure-lowering utility operative after carbonation in said chamber for reducing the carbon dioxide pressure prior to dispensing of the carbonated beverage.

The aspect related to in the previous paragraph will be referred to herein as the "pressure release aspect".

The pressure-lowering utility may comprise a regulator for releasing excess pressure which is in gas communication with said chamber. The pressure-lowering utility may also comprise an outlet fitted with a module, e.g. a cyclone, configured for separating between the gas and the liquid droplets that may be carried by it and then either circulate the liquid separated from the ensuing gas back into the flow system or dispense of it, e.g. drain the liquid into a drainage.

The reduction in pressure prior to dispensing of beverage allows for control of the residual pressure within the chamber, thereby ensuring sufficient pressure to propel the carbonated liquid towards the dispensing outlet, and at the same time providing smooth dispensing of beverage from the outlet (i.e. without undesired spillage or uneven flow which may result from excessive residual pressure or insufficient residual pressure).

The operational cycle of an apparatus of the pressure release aspect may comprise (a) introducing a quantity of liquid into the carbonation chamber through a liquid inlet, (b) introducing a quantity of carbon dioxide into the carbonation chamber for carbonating the liquid, (c) activating the pressure-lowering utility to reduce the gas pressure in said chamber to a predefined pressure upon completion of the carbonation, and (d) dispensing a quantity of carbonated beverage. The dispensing of a quantity of beverage may be propelled by gas pressure (i.e. residual pressure) in the carbonation chamber.

According to another aspect of the invention, the beverage dispensing apparatus comprises a liquid flow system, a carbonation sub-system and a beverage dispensing outlet. The liquid flow system defines a liquid flow path between a liquid source and the beverage dispensing outlet. The carbonation sub-system serves for carbonating a quantity of liquid. The carbonation sub-system comprises a carbonation chamber linked to the liquid flow system for receiving a quantity of liquid from said source and is associated with a pressurized carbon dioxide source for carbonating said quantity while in said chamber. The chamber, according to this aspect, is also associated with a circulation pump for circulating liquid between a circulation outlet and a circulation inlet of the chamber during carbonation of the liquid.

The aspect related to in the previous paragraph will be referred to herein as the "circulation pump aspect".

The circulation mechanism employed in the circulation pump aspect comprises a circulation pump, associated with the carbonation chamber, and adapted to circulate liquid between a circulation outlet and a circulation inlet of the carbonation chamber. It should be noted, however, that the invention is not limited to the use of a pump and other liquid circulation mechanisms, such as use of a stirrer, are also possible.

According to this aspect, the pump is activated during carbonation and liquid is circulated between said outlet and inlet, causing concomitant flow of liquid through the chamber (in the general direction from the circulation inlet to the circulation outlet), thereby circulating a quantity of liquid to be carbonated continuously through the chamber. Depending on the rate of pumping—the liquid may circulate one time, few times or may only partially circulate through the chamber.

The liquid circulation enables effective carbonation while using relatively low pressures of $CO_2$, thereby maximizing the utilization of a $CO_2$ canister, lowering the risk of malfunctions associated with application of high-pressure systems and lowering overall costs by allowing the usage of components adapted for lower gas pressures.

The operation sequence of the apparatus of the circulation pump aspect typically comprises the following steps: (a) introducing a quantity of liquid into said chamber; (b) carbonating the liquid contained in the chamber during its circulation; and (c) dispensing a quantity of carbonated beverage.

According to an embodiment of the circulation pump aspect, the operational sequence comprises the opening of a liquid inlet valve that controls flow through a liquid inlet feeding liquid into the carbonation chamber. Then a carbonation step is initiated, comprising two actions that proceed together: (i) opening of a gas valve for introducing a quantity of pressurized carbon dioxide into said chamber to carbonate the liquid in the chamber, and (ii) at the same time activating the circulation pump to circulate the liquid during carbonation. At the end of the carbonation step the circulation pump is stopped and then, for dispensing, an outlet valve is opened to thereby permit gas pressure within the chamber to propel the carbonated liquid to the beverage dispensing outlet.

In the following description various embodiment will be describes with reference to one or both of the above aspects.

It should be noted that according to the invention these aspects may be combined. For example, an apparatus for dispensing of a beverage according to the invention may comprise a carbonation system with a pressure-lowering utility and also be associated with a liquid circulation pump. Also, embodiments described with reference to the circulation pump aspect may be implemented in an apparatus of the pressure release aspect; and vice versa.

The quantity of liquid introduced into the chamber may be substantially equal to the quantity of carbonated beverage to be dispensed. The quantity of liquid may be a "unit quantity" having a volume substantially equal to the volume of the carbonation chamber. The unit quantity, i.e. a batch, is of a predetermined volume of liquid, typically determined when designing the carbonation sub-system, providing for carbonation of a limited quantity of liquid in each cycle of operation of the system. The unit quantity may be, for example, 200 milliliters (such as a volume of a cup), 300 ml, 400 ml (about 2 cups), 500 ml, 1 liter, etc. In each cycle of operation, a unit quantity of liquid is introduced into the carbonation system, followed by carbonation and subsequent dispensing of the entire unit quantity of carbonated beverage. The volume of the carbonation chamber may, by an embodiment, be made to be substantially equal (or slightly more) than said unit quantity of liquid to be carbonated in each batch. This also enables the user to prepare serving quantities of freshly carbonated liquid for consumption upon demand, relatively quickly, e.g. every few seconds. It should be noted, however, that by an embodiment of the invention, the user may control the amount of a dispensed quantity of carbonated beverage. In case the dispensed volume of beverage is less than the full volume of the carbonation chamber, the carbonated liquid remaining in the chamber may then be mixed with fresh liquid introduced into the chamber in a next cycle; consequently, less carbon dioxide may be needed for carbonation in the next cycle for a given carbonation strength.

Repeating the carbonation operation several times in succession may cool the chamber, e.g. in consequence of the gas pressure release. Thus, in order to avoid undesired reduction of temperature below freezing, which may have undesired consequences, by an embodiment of the invention the carbonation chamber is associated with a heating element, e.g. a heating label or jacket in association with at least a portion of the external surface of the carbonation chamber. Such a heating element may be operated continuously, may be operated automatically upon lowering of the temperature below a certain threshold, etc.

By some embodiments, the carbonated liquid is propelled out of the carbonation chamber to dispense the beverage from the dispensing outlet by the residual gas pressure within the chamber. However, it is also contemplated within an embodiment of the invention that carbonated beverage will be propelled to the dispensing outlet gravitationally or by means of a pump.

The operation steps of the cycle may be followed by release of pressure from the carbonation chamber upon completion of a sequence of operation.

The operational cycle of an apparatus of the circulation pump aspect may also comprise, by other embodiments, the following steps: (i) opening a liquid inlet valve controlling liquid flow through the liquid inlet into the chamber, to feed liquid into the carbonation chamber, (ii) opening a gas valve to introduce a quantity of pressurized carbon dioxide into the chamber to carbonate the liquid in the chamber, (iii) inducing liquid circulation within the carbonation chamber during carbonation, and (iv) opening a liquid outlet valve controlling liquid flow from the chamber to the dispensing outlet, thereby permitting the pressure within the chamber to propel the carbonated beverage to the dispensing outlet. The operational cycle may also comprise the optional step of (v) opening a gas release valve to release $CO_2$ gas pressure from the chamber.

By an embodiment of the invention, the quantity of pressurized carbon dioxide introduced into the carbonation chamber is adjustable in order to prepare carbonated beverage having different carbon dioxide concentrations, to thereby cater to different preferences of different users. In other embodiments, different carbonation levels may be obtained by controlling the $CO_2$ pressure prior to introduction into the carbonation chamber.

In some embodiments, either a quantity of carbonated beverage or a quantity of non-carbonated beverage is dispensed through a single dispensing outlet upon user demand. Typically, the user can select between carbonated or non-carbonated beverage that may be dispensed through the same dispensing outlet (preferred) or each through a different outlet. The term "dispensing outlet" will be used to denote a carbonated beverage dispensing outlet, a non-carbonated beverage dispensing outlet or an outlet intended for dispensing of both carbonated and non-carbonated beverage.

Demand for carbonated beverage initiates a sequence of operation of the carbonation sub-system to provide a quantity of carbonated beverage; demand for non-carbonated beverage will cause the apparatus to dispense a quantity of non-carbonated beverage, which may be a pre-determined unit quantity or a free (quantified by the user) flow of non-carbonated beverage. Non-carbonated beverage may be provided by permitting liquid to flow through the carbonation chamber without activation of the carbonation sub-system. Such an arrangement allows for effective utilization of the internal space of dispenser while maintaining compactness of the system.

In other embodiments, the apparatus comprises a bypass conduit, provided with a valve arrangement or another flow control element that bypasses the carbonation sub-system to channel liquid directly from the cleaning sub-system to the dispensing outlet.

A user may select between dispensing of carbonated or non-carbonated beverage by known means, such as pressing an actuation button, selecting the desired option out of options presented by a display panel, etc. The selection initiates the appropriate operation sequence to match the selection, as will be disclosed hereinbelow. Upon demand of carbonated beverage the operation sequence may provide carbonated beverage prepared on demand (freshly made). Alternatively, upon demand, carbonated liquid already prepared and stored within the apparatus may be dispensed, followed by carbonation and storage of a new quantity of carbonated liquid.

The carbonation chamber of the invention may comprise a gas release valve for releasing the pressure of $CO_2$, e.g. between cycles of operation or upon demand for non-carbonated beverage. The carbonation chamber may also comprise a safety pressure valve designed to automatically release excess-pressure that may be formed within the carbonation chamber during malfunctioning of the system.

The carbonation sub-system may comprise a liquid level sensor for sensing the level of liquid in the chamber. The liquid level sensor may be associated with a closed-loop control system for controlling the liquid level in the carbonation chamber to thereby regulate the quantity of liquid fed into or dispensed out of the carbonation chamber, as well as gauge the level of liquid in the chamber at any given time during the sequence of operation.

The apparatus usually comprises a valve arrangement for controlling liquid ingress to and egress from the carbonation chamber. Such a valve arrangement may comprise at least one valve for controlling liquid ingress into said chamber, e.g. fitted at liquid inlet or fitted somewhere on the liquid feed line; and/or may comprise at least one valve for controlling liquid egress out of said chamber, e.g. fitted at the liquid outlet or fitted somewhere on the conduit line linking the chamber to the dispensing outlet. Typical types of valves appropriate for use in the system of the invention may be, for example, flow control valves or on/off valves.

By an embodiment of the invention the apparatus comprises a liquid cleaning sub-system disposed in the liquid flow system for removing contaminants from the liquid and for feeding cleaned liquid to the carbonation chamber.

The liquid cleaning sub-system is disposed between a liquid source, e.g. running water source, water container, water reservoir, etc., and the carbonation chamber, and may comprise, by some embodiments, at least one of a liquid filtration unit, a liquid disinfection unit or a liquid purification unit for filtering and/or disinfecting and/or purifying the liquid before introducing it into the chamber. Such filtration/disinfection units may be, inter alia, mechanical filters for filtering particles from the liquid, such as a carbon filter, woven or non-woven filter paper, etc.; chemical filters, e.g. activated carbon, for adsorbing or eliminating chemical contaminants, such as heavy metals, arsenic, sulfur, etc.; bacteriocidic active materials for eliminating presence of bacteria; disinfecting devices, such as UV-based assemblies; or any combinations thereof. Examples of water cleaning sub-system useful also in an apparatus of the invention are (i) such disclosed in U.S. Pat. No. 7,987,769, or (ii) such making use of filters of the kind disclosed in WO2007/017864, WO 2008/026208 or WO 2011/030340.

The liquid cleaning sub-system may comprise a disinfection chamber linked to the carbonation chamber, such that the outlet of the disinfection chamber is connected to the liquid inlet of the carbonation chamber. The disinfection chamber and the carbonation chamber may be connected via a conduit or tubing, and may, according to an embodiment of the invention, be attached to one another, e.g. with an upper face of the carbonation chamber being associated with a bottom face of the disinfection chamber. Such an association provides for compact arrangement of the sub-systems in a dispenser apparatus comprising them.

The invention also provides in another one of its aspects, a liquid treatment system comprising a liquid purification sub-system, a carbonation sub-system, and a control unit. The liquid purification sub-system comprises a disinfection chamber, and a disinfection module operating within the disinfection chamber for disinfecting the liquid in or passing through the disinfection chamber. The carbonation sub-system is one of the above describe embodiments.

In an embodiment, a liquid outlet of the disinfection chamber is connected to a liquid inlet of the carbonation chamber. The disinfection chamber and the carbonation chamber may be integrated with one another with at least one wall of the disinfection chamber being tightly associated with at least one wall of the carbonation chamber.

The two chambers may be integrally formed with one another into one liquid treatment arrangement. In such an embodiment, this liquid treatment arrangement may comprise a first chamber defining said disinfection chamber and a second chamber defining said carbonation chamber. The disinfection chamber in such a treatment arrangement is typically situated above the carbonation chamber. By some embodiments, the disinfection chamber has a first, broad portion and a second, narrow portion formed at its bottom that extends into and is enveloped by the carbonation chamber. The liquid outlet of the disinfection chamber may be formed at the bottom of said second portion.

The disinfection module, by some embodiments, comprises a disinfecting UV light source. The UV light source may be in the shape of an elongated tube. By one embodiment, the disinfection chamber has a bottom elongated lumen that accommodates a bottom portion of the UV light source (this lumen being generally cylindrical, typically being also slightly larger in diameter than the UV light source) with the outlet of the disinfection chamber being at the bottom of said lumen. In this manner, the egressing liquid flows along the bottom portion of the UV light source for proper disinfection. The light source may be replaced through a lid that can be opened/closed by a user, typically at the top of the chamber.

A system as described above may be a part of a beverage dispensing apparatus (or a dispenser). Such an apparatus may also comprise a cooling unit for cooling the cleaned liquid prior to its introduction into the system of the invention (such as the cooling unit disclosed in WO 2011/030339). By some embodiments, the cleaning sub-system is incorporated into a cooling chamber of a liquid cooling unit for simultaneous cooling and cleaning of the liquid received from the liquid source prior to carbonation to effectively improve the utilization of internal space of the apparatus and consequently enabling a reduction in the apparatus external dimensions. Other than the option of providing cooled beverage to the user, such cooling prior to carbonation allows for better dissolution of the carbon dioxide, i.e. $CO_2$, in the water.

According to an embodiment, the same liquid flow path utilized for dispensing of carbonated beverage may also be utilized for dispensing non-carbonated beverage. According to this embodiment, upon demand for non-carbonated beverage, the sequence of operation comprises introducing liquid into the carbonation chamber; and dispensing beverage without introducing pressurized carbon dioxide into the chamber. According to another embodiment, upon demand of non-carbonated beverage, the liquid is directed to a carbonation chamber bypass conduit with the appropriate liquid flow control element for feeding non-carbonated liquid to the dispensing outlet.

The system may additionally comprise a control module for inducing, upon demand of carbonated beverage, an operational sequence/cycle, e.g. those noted above. Such a control module may control the opening and closing of the respective valves in order to ensure proper operation of the cycle, the activation and deactivation of a circulation pump, and regulate the flow of liquid and $CO_2$ throughout the system.

The control unit is operative to induce the operation sequence of introducing a quantity of pressurized $CO_2$ into the carbonation chamber and inducing liquid circulation to be carried out concomitantly therewith.

The control mechanism may also be linked to a user-activated dispensing button or other dispensing-initiating activator included in a user's interface, whereupon initiation of a dispensing activation signal a dispensing sequence is induced, dispensing of a quantity of carbonated or non-carbonated beverage according to a user's choice; involving the opening or shutting of respective flow-control valves or pumps. In the case of the dispensing of carbonated beverage, the propelling force is the excess gas pressure remaining in the carbonation chamber following the carbonation step.

A beverage dispensing system by some embodiments comprises a replaceable $CO_2$ canister that is linked to the carbonation system. Alternative arrangement may include link to a pressurized carbon dioxide feed line. A replaceable canister is detachably connected to a connector in the dispenser. The canisters are typically elongated pressure vessels that contain a quantity of pressurized $CO_2$ for a plurality of operational cycles for dispensing carbonated beverage. The canister has a pressurized $CO_2$ compartment and may be configured with a neck portion adapted for connection to the connector. The neck portion has an arrangement for sealing the canister's pressurized $CO_2$ compartment prior to its connection to the connector and for opening a fluid link upon connection so as to permit the pressurized $CO_2$ to flow into the carbonation sub-system. Typically, the canister's pressurized $CO_2$ compartment is sealed by a pierceable or deformable seal that is pierced or deformed, respectively, upon connection of the neck portion to the connector.

The connection of the canister's neck to the connector may be of a threaded type, e.g. with male threading on the neck and female threading in a matching recess in the connector. The connection may also be of a bayonet type, may be a snap-fitting connection and others. As will be appreciated any type of connection that may connect a neck to a connector within the dispenser device in a manner that also permits detachment while maintaining gas-tight seal upon operation, may be employed.

Piercing or deformation of a seal causes an abrupt release of pressurized gas out of the $CO_2$ compartment which may be accompanied by short noise burst (e.g. explosion-like noise) and in order to dampen any such noise the connector may be provided with a noise-damping seal that absorbs the shock wave of the released gas and blocking release thereof to the exterior.

By an embodiment of the invention, the connector can swivel about an axis normal to a longitudinal axis of the canister between an attachment/detachment state and an operational state. The canister is connected to or detached from the connector when in the attachment/detachment state and then swiveled to the operational state to enable use thereof. In the operational state the canister is typically fitted so as its longitudinal axis lies substantially parallel to an external wall of the dispenser, thereby providing a compact arrangement. Typically (but not exclusively) the connector is fitted to a linking member with the capability of rotational movement of one end thereof, linked to the connector, with respect to the other end that is fixed to the apparatus. This rotational degree of freedom can provide for the swiveling movement of the connector.

The connector and the linking element jointly define a sealed gas flow path, from the canister to the carbon dioxide inlet. By one embodiment an electrically-driven, e.g. a solenoid type valving arrangement is fitted in the flow path to control gas flow. This valving arrangement may be activated upon demand for carbonated beverage. The dispenser typically comprises an entry valve at the carbon dioxide inlet for controlling the carbonation operation. The valving arrangement may be in addition (e.g. as an added safety measure) or in the alternative to the entry valve.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the embodiments described below the liquid and beverage is water. Specific reference made to water should be regarded as an example only and is not intended to limit the scope of the invention.

Figure 1:
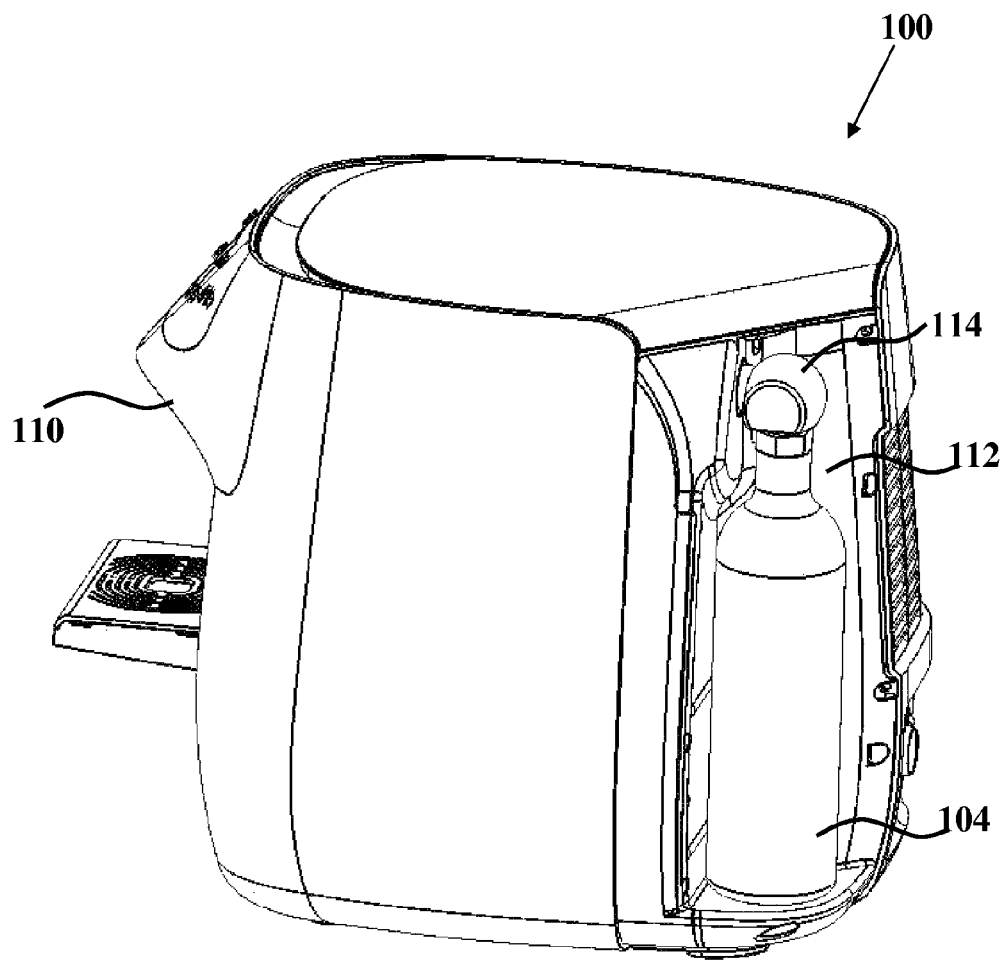
FIG. 1 is a perspective side view of a beverage dispensing apparatus according to an embodiment of the invention, with a portion of the wall being removed to show the detachable $CO_2$ fitted in a dedicated space at the rear portion of the apparatus.
Figure 2:
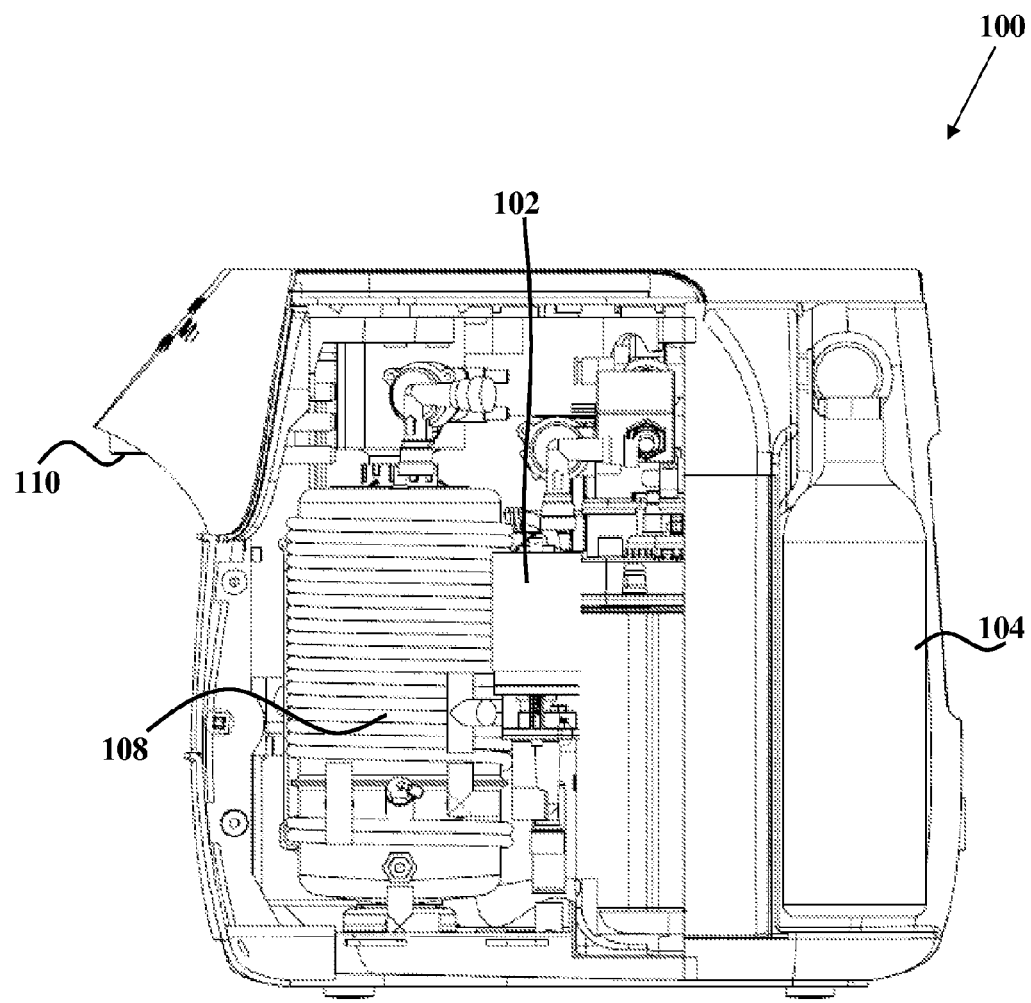
FIG. 2 shows a side view of the apparatus of FIG. 1 with the side wall having been removed to reveal internal elements, particularly elements of the carbonation sub-system.
Figure 3:
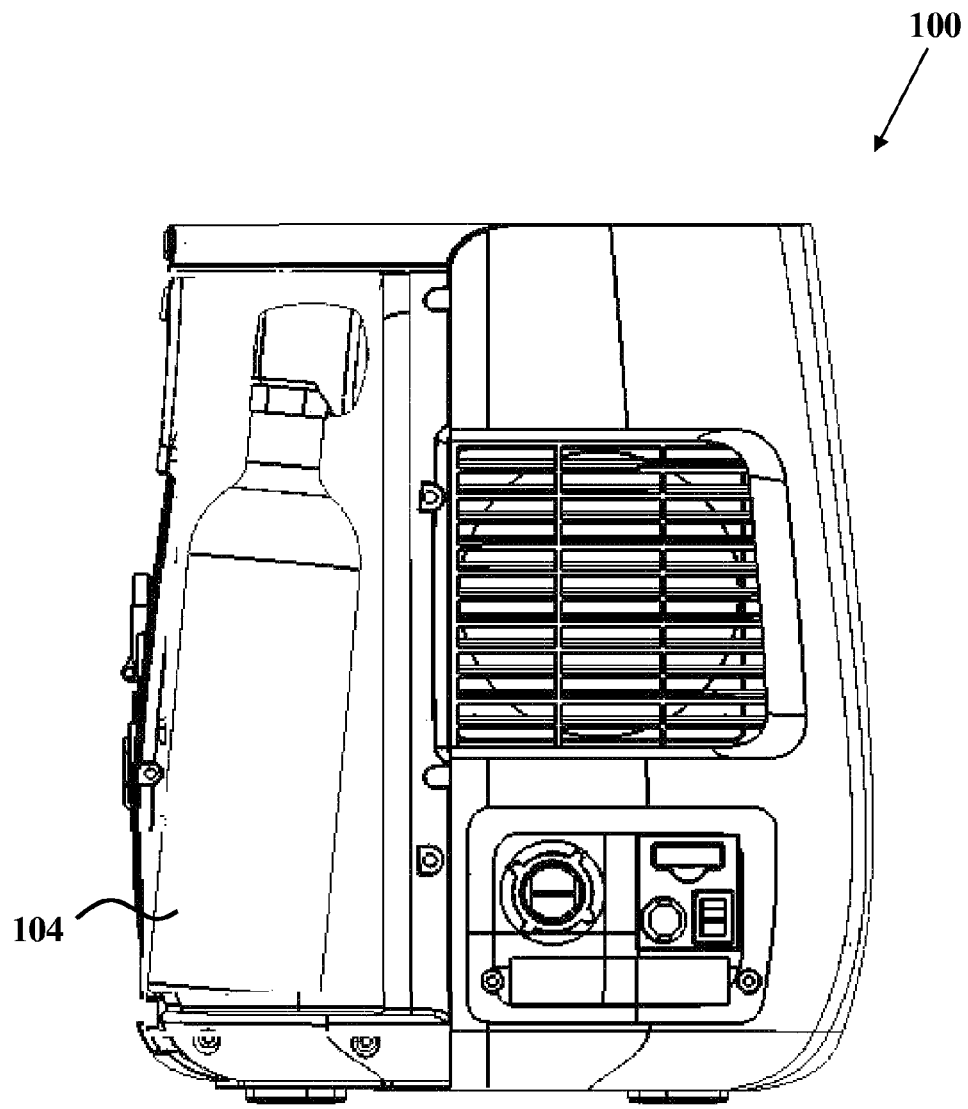
FIG. 3 is a rear view of the apparatus of FIG. 1 with the canister being tilted into the detachment/attachment position.
Figure 4:
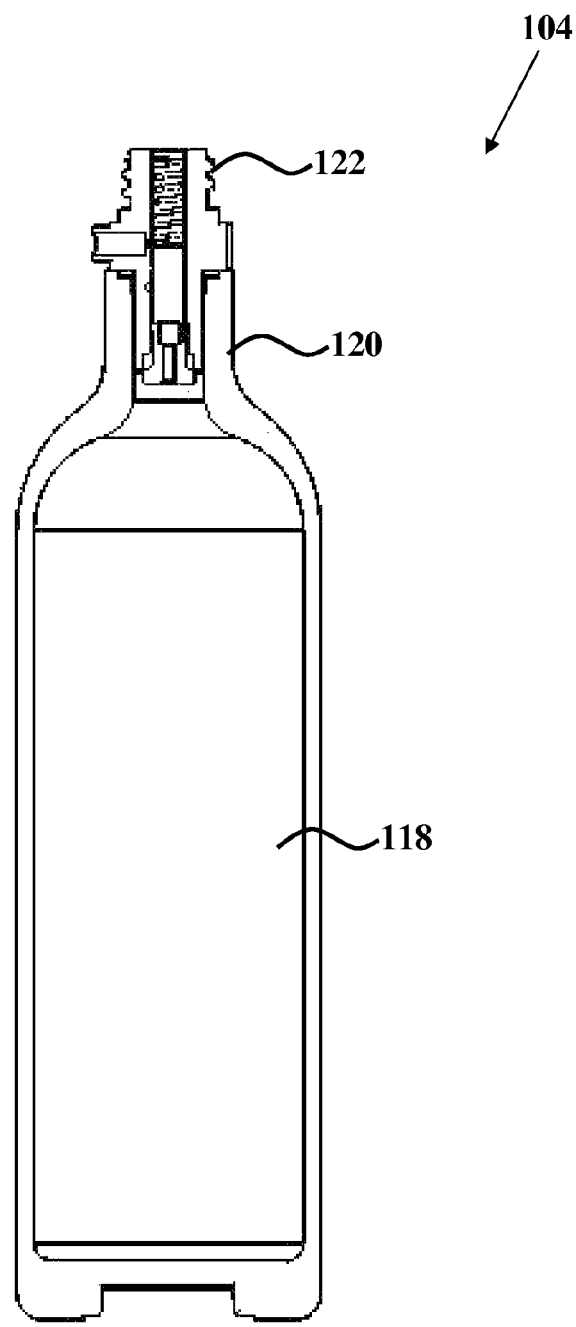
FIG. 4 is a cross section through the canister.
Figure 5:
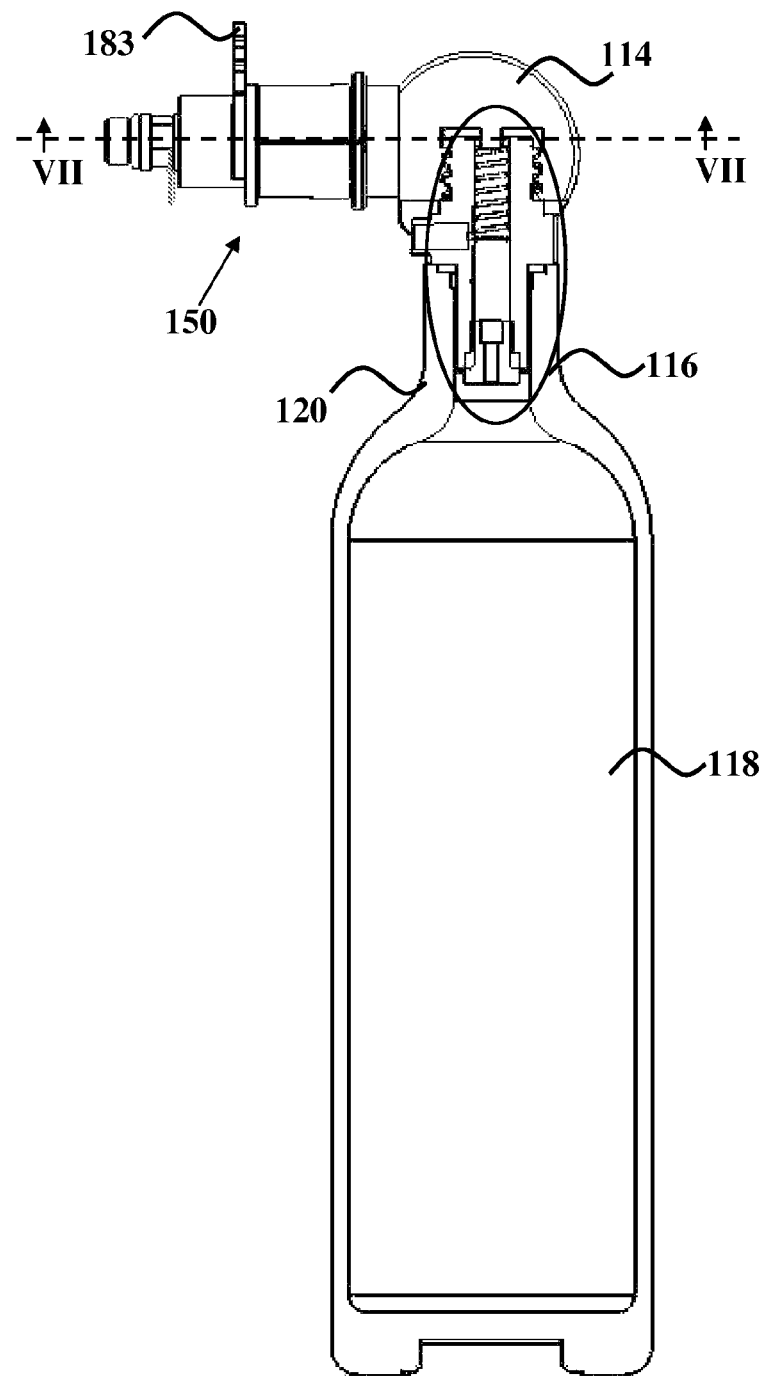
FIG. 5 shows a cross-section through a canister connected to the connector and through the associated linking element that provides for gas flow communication between the connector to the carbonation system within the apparatus.

Referring first to FIG. 1 and FIG. 2, showing a water dispensing apparatus (will be referred to also as "dispenser") 100 according to an embodiment of the invention. The apparatus has a water inlet (not shown), linked to and in flow communication with a water source. It includes a filter 102 disposed in the flow path of the water in the apparatus. The water may be propelled through its flow path within the apparatus by a pump (not shown) or by gravitational means. The apparatus includes a UV disinfection module and a water cooling unit (both not shown in this figure but will be described in connection with other embodiments below), which may, for example, be of the kind described in WO 2011/030339. The apparatus includes a water treatment arrangement 108 (to be described further below) and a dispensing outlet 110 for dispensing carbonated or non-carbonated water. A $CO_2$ canister 104 is accommodated within a space 112 defined in the rear of the apparatus with its longitudinal axis being substantially parallel to side walls of the apparatus. The canister, as can be seen in FIGS. 4 and 5, has pressurized $CO_2$ compartment 118 and a neck portion 120 that has an external screw-threading 122. The neck portion is connected, as can be seen in FIG. 5, in a screw-fit manner to a connector 114 that has a recess with an internal screw-threading that matches the threading 122 on neck portion 120. Connector 114 can swivel about an axis defined by lines VII-VII in FIGS. 5 and 7 that is normal to the canister's longitudinal axis, in a manner to be described further below. Through this swivel the canister can switch from its use position shown in FIG. 1 to the detachment/attachment position seen in FIG. 3, in which the used canister may be detached and a new, fresh canister attached in its place. Such swiveling arrangement allows for ease of replacement of the canister by a user, while affording for compact external dimensions of the apparatus.

Figure 6:
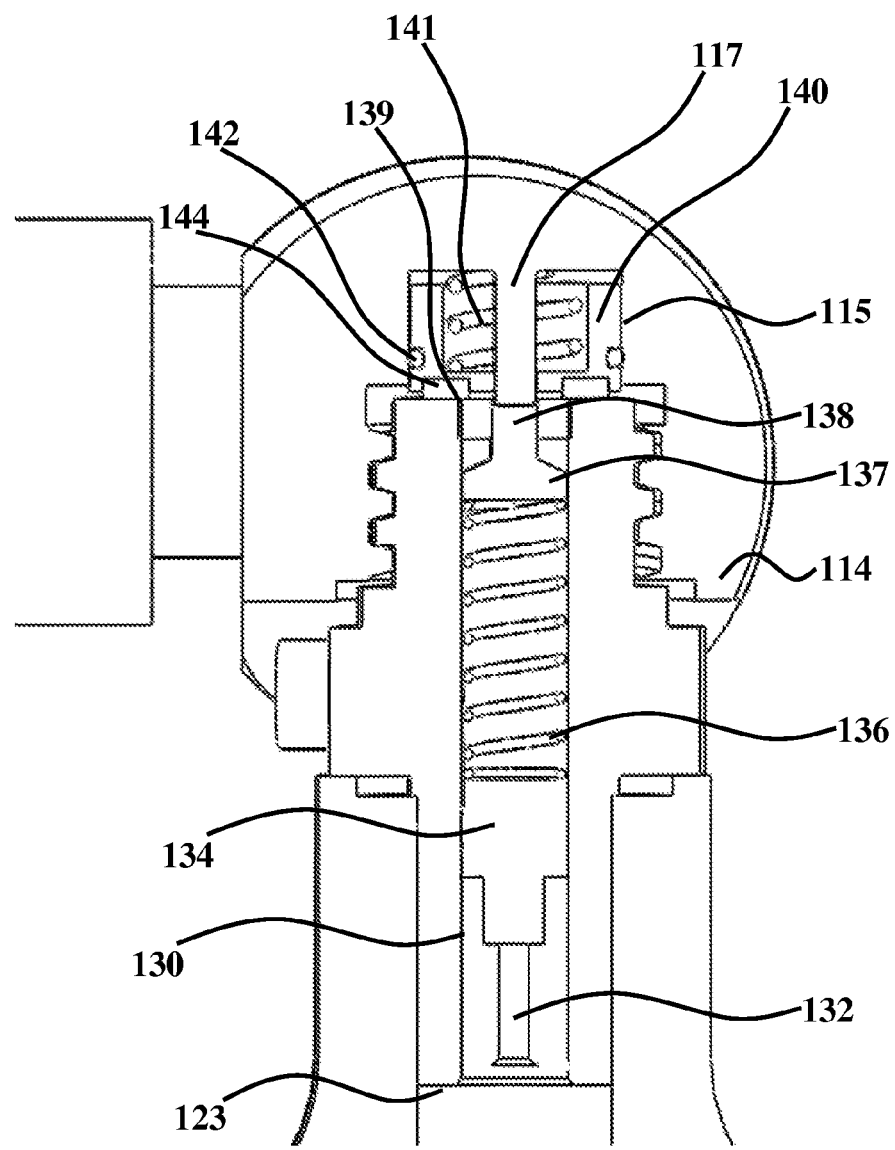
FIG. 6 an enlarged section of the arrangement designated 116 in FIG. 5.

The neck portion, as can best be seen in FIG. 6, accommodates a gas-release arrangement, generally designated 116, that seals the canister when not in use but which opens by an abutment 117 defined within the recess 115, upon connection of the canister's neck to the connector. Arrangement 116 comprises a lumen 130 accommodating a pin element having a pin portion 132 and a base 134 that bears against a helical spring 136. At its other end spring 136 bears against plunger 137 that has a pinhead 138 that can protrude out through opening 139. The opening of the pressurized $CO_2$ compartment 118 is sealed by a deformable seal 123. Upon connection, abutment 117 engages pinhead 138 to thereby cause plunger 137 to retract into lumen 130, compressing spring 136 which then exerts a biasing force onto the pin element's base 134. Consequently pin portion 132 is pushed against seal 123 causing it to deform and thereby opening compartment 118 to release gas into lumen 130 and from there into gas receiving space defined by recess 115, wherefrom gas can flow through a flow path defined the linking element 150 (see below) leading the pressurized $CO_2$ into the carbonation sub-system, the operation of which will be described below.

Held within recess 115 is a cup element 140 that is biased to axially extend by a spring 141 (seen in a retracted state in FIG. 6). Before connection of the neck portion 120 of the canister 104 to the connector 114 the cup element 140 is axially extended and during connection it retracts to the position shown in FIG. 6, where the abutment 117 bears against pinhead 138. This arrangement insures gradual increased pressure onto plunger 137. The interior of cup element 140 is sealed by an O-ring 142 that bear against the walls of recess 115 and by a concentric sealing element 144 which provides a seal between the upper face of the canister's neck portion and the bottom face of the cup element 140. Upon deformation of deformable seal 123 there is an abrupt release of pressurized gas from compartment 118 which may cause a transient loud noise (i.e. an explosion-like noise). The sealing element 144 also has a noise-damping functionality achieved by its elasticity.

Figure 7:
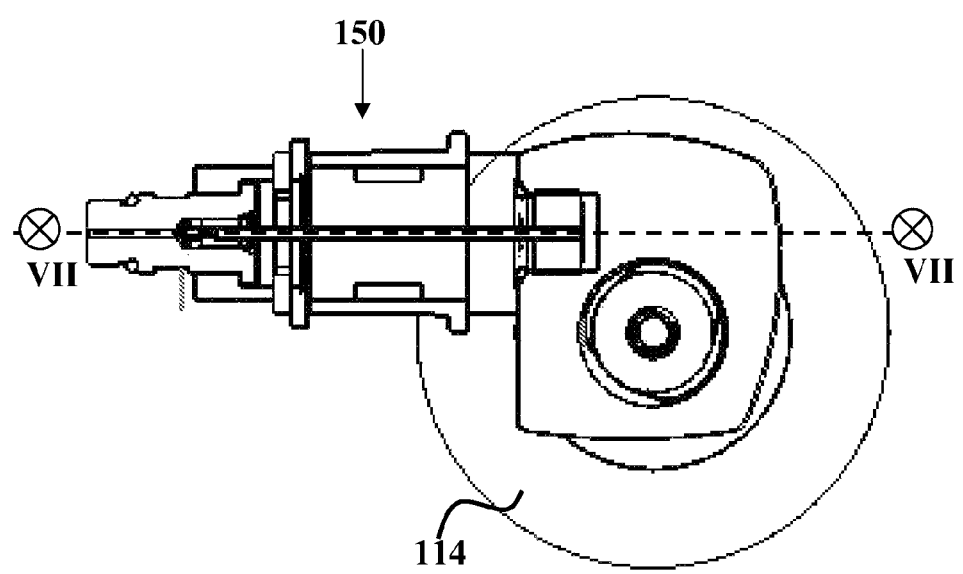
FIG. 7 shows a cross-section through line VII-VII in FIG. 5.
Figure 8:
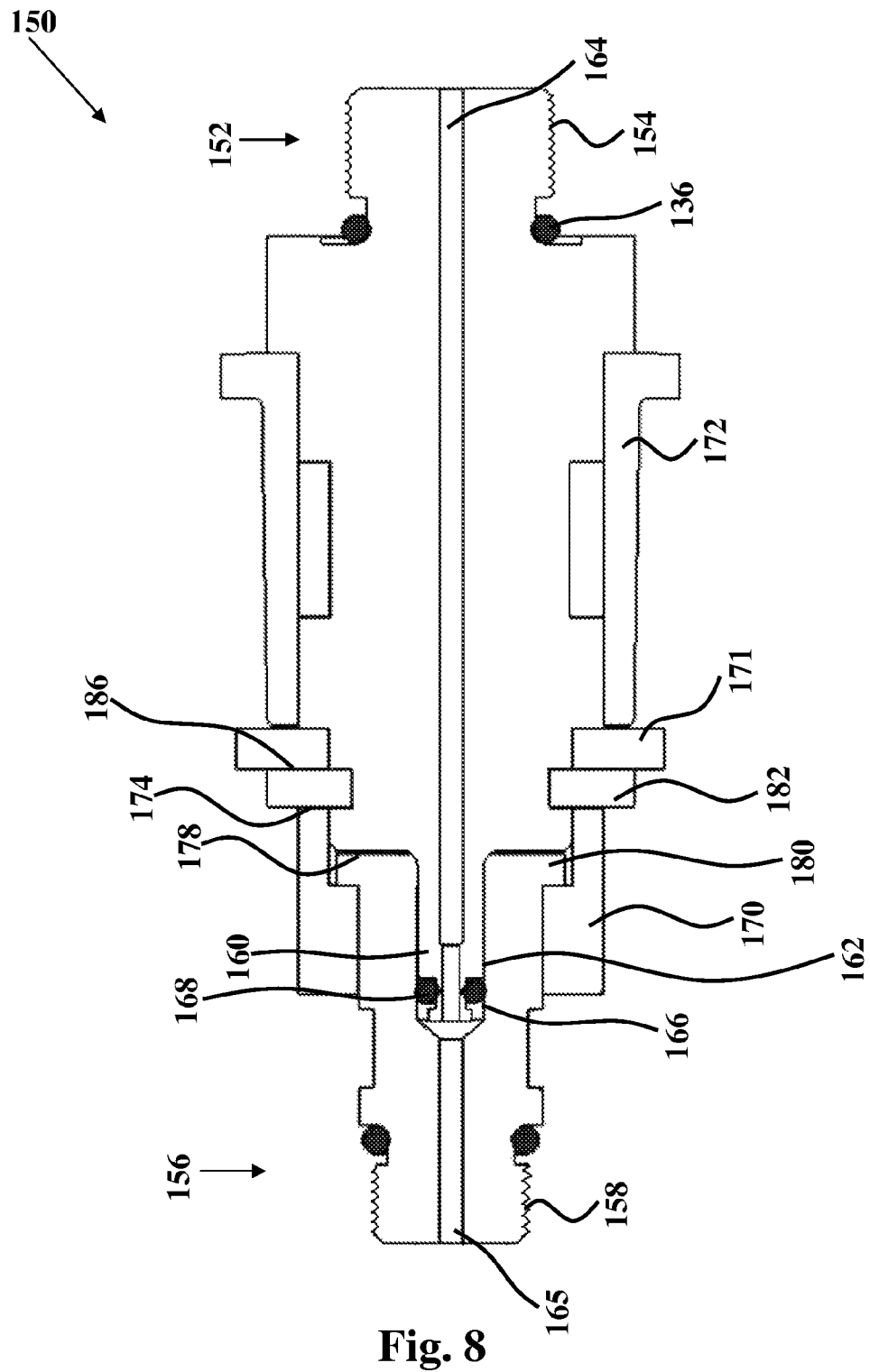
FIG. 8 is a longitudinal cross-section through the linking element.

The engagement of the connector 114 with the linking element 150 can best be seen in FIG. 7 and the internal structure of the linking member in FIG. 8. The linking element has a first block 152 having an integral externally screw-threaded engaging member 154 protruding from one end of linking element 150, and a second block 156 having an integral externally screw-threaded engaging member 158 at the opposite end of linking element 150 for engaging with a gas entry valve (not shown) of the dispenser. Block 152 includes a generally cylindrical extension 160 that fits into a matching recess 162 in block 156 in a manner permitting relative axial rotation about the longitudinal axis of the linking element, which corresponds to axis VII-VII noted above. Block 152 has a central bore 164 co-axial and linked to central bore 165 formed in block 156, which jointly define a duct that provides a gas flow path. The tip of extension 160 includes a circumferential groove 166 accommodating an O-ring 168 that ensures a gas-tight seal that blocks leakage of pressurized gas from within bores 164 and 165.

Blocks 152 and 156 are held together by external embracing members 170 and 171 (which constitute the same part). Member 172 is a sliding element between the body of apparatus 100 and linking element 150. Member 170 has an internal shoulder 178 that bears against skirt 180 of block 156. Circumferential ring 182 partially fits into a partial circumferential slit 174 defined in member 170 and inside partial circumferential groove 186 of member 171. This arrangement secures blocks 152 and 156 together, as seen in FIG. 8, while permitting axial rotation of block 152 vis-à-vis block 156.

Circumferential ring 182 is integral with a fixing ear 183, seen FIG. 5 for preventing axial movement of the linking element onto the frame of apparatus 100.

Figure 9:
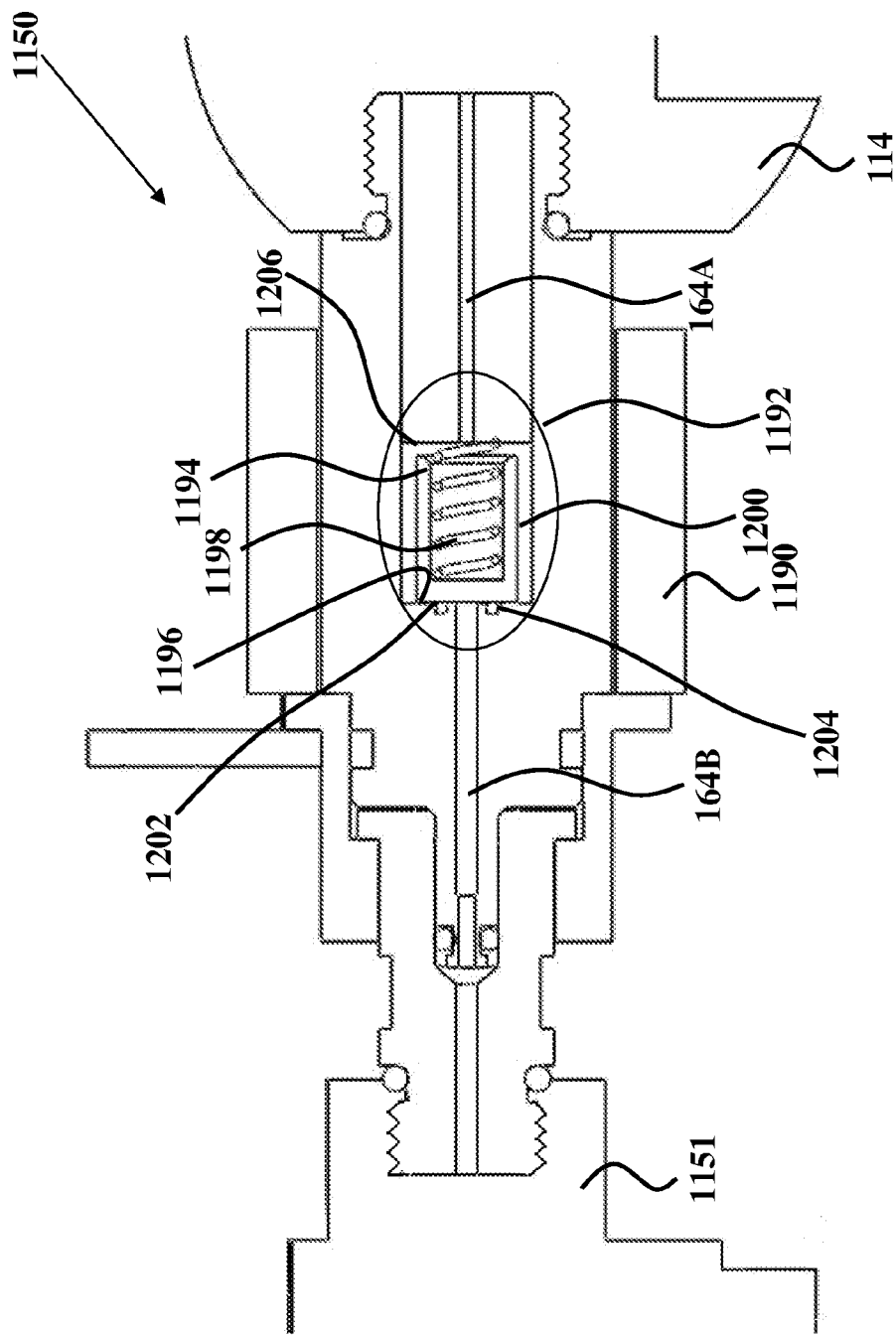
FIG. 9 is a longitudinal cross-section through a linking element of another embodiment.

Another embodiment of a linking element 1150 is shown in FIG. 9 engaged at its one end to connector 114 and at its other end to an engaging element 1151 of the gas entry valve (not shown). Linking element 1150 has an overall similar structure with like components to that of element 150 and the reader is referred to the above description of element 150 for understanding the structure and function of such components. The main difference resides in the inclusion of a solenoid 1190 and a solenoid-driven safety valve 1192 disposed in block 152 separating between central bores 164A and 164B. The safety valve 1192 is accommodated within a space 1200 and includes a cup-shaped plunger 1194, typically made of a magnetic or a ferromagnetic material, having an end face 1196 that bears against an internal end face 1202 of space 1200 with the intermediary O-ring 1204 to thereby seal duct 164B. The cup element is biased against end face 1202 by a spring 1198 that is held against the opposite internal end face 1206. As can be seen the length of the cup-shaped plunger 1194 is short of the length of space 1200 leaving a small clearance for axial retraction of plunger 1194 away from end face 1202, induced by solenoid 1190. Typically, upon demand for carbonated drink the solenoid 1190 is activated causing the plunger 1194 to retract and thereby open the gas link between duct 164A and duct 164B.

Figure 10A:
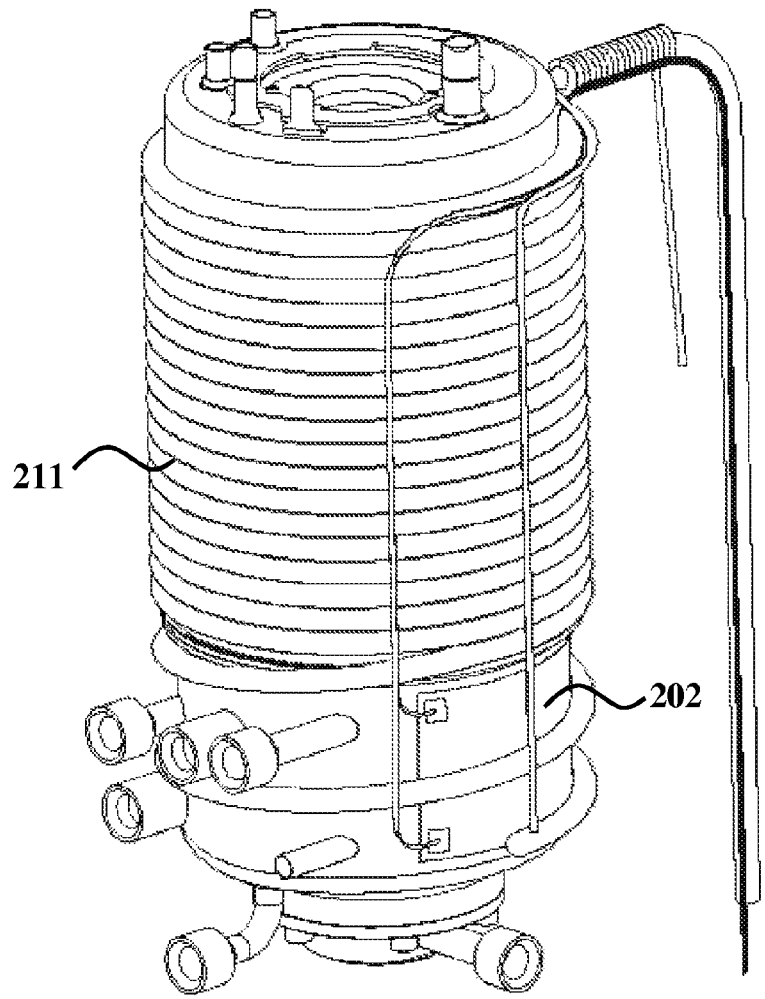
FIG. 10A is a perspective view of a carbonation sub-system with an associated liquid disinfection unit and being enveloped by a cooling jacket according to an embodiment of the invention.
Figure 10B:
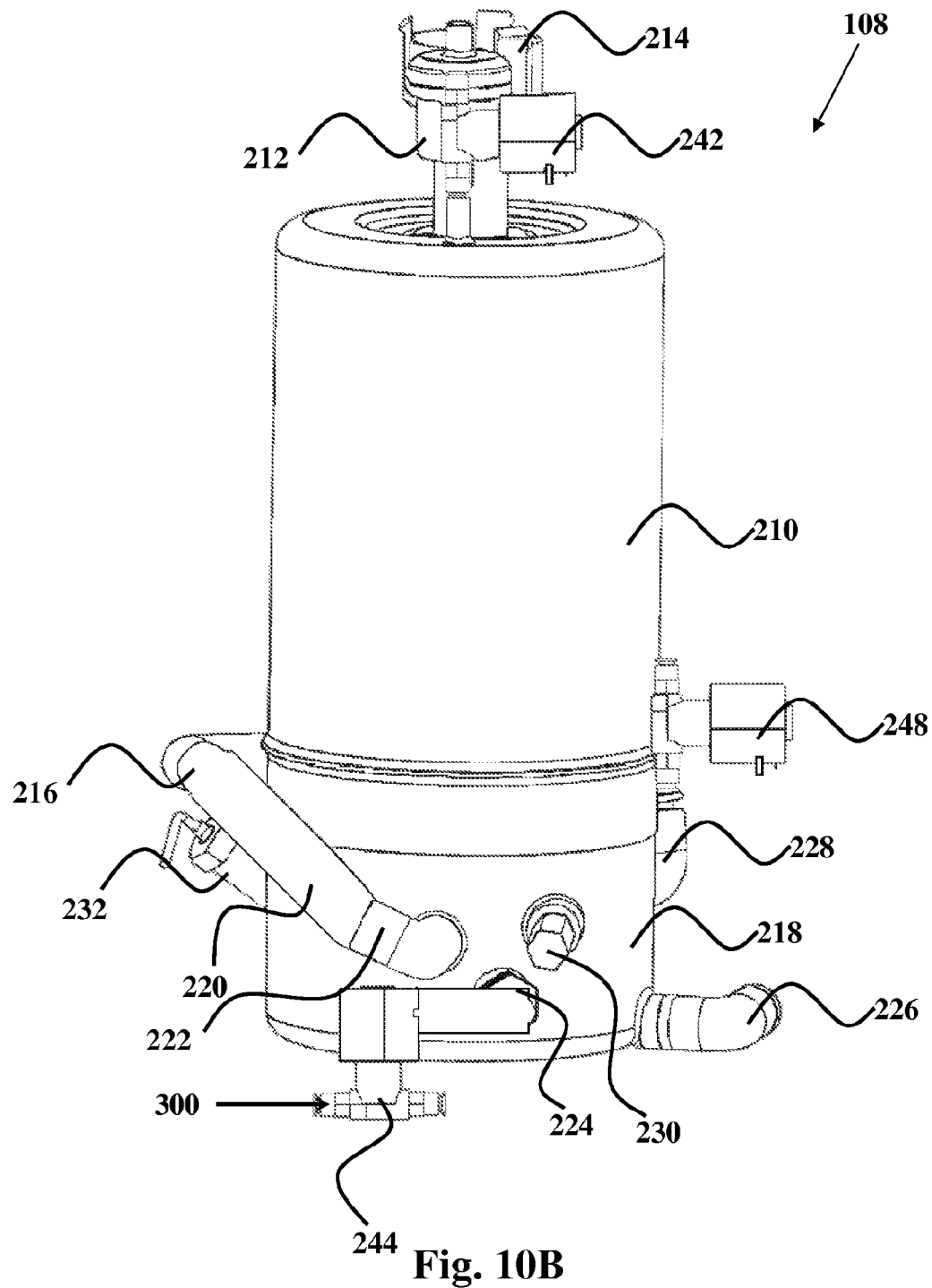
FIG. 10B is a perspective view of a carbonation sub-system with an associated liquid disinfection sub-system according to an embodiment of the invention.
Figure 11:
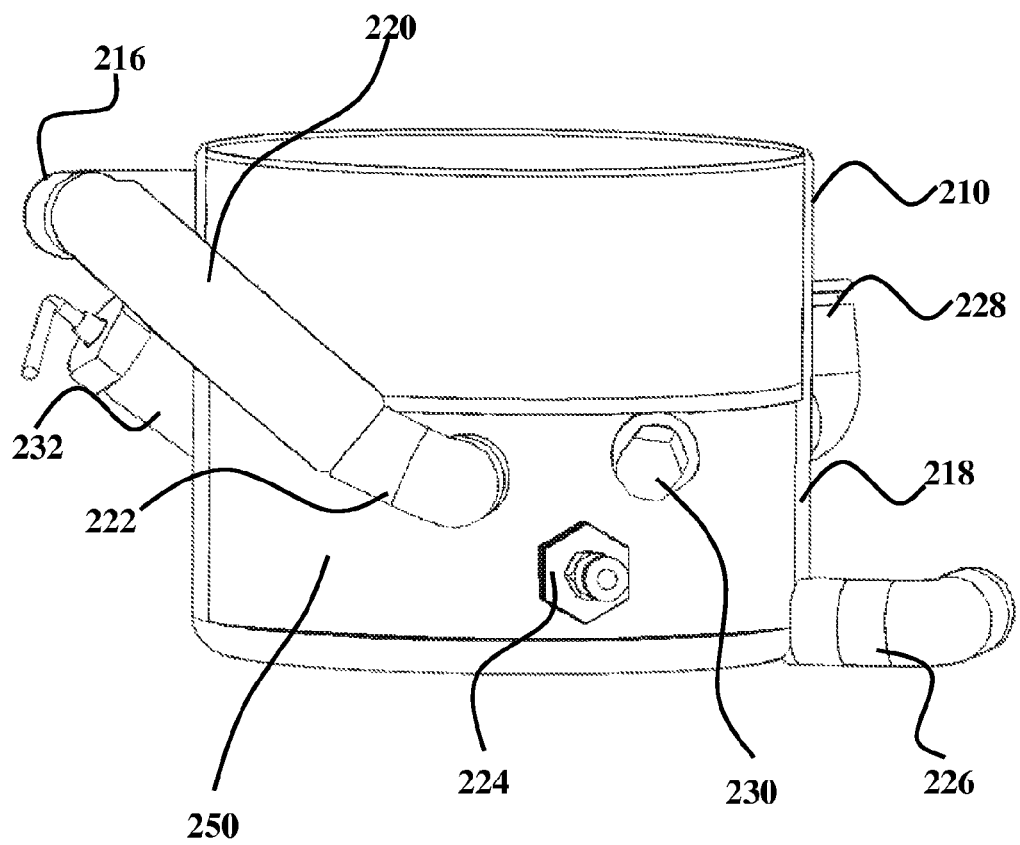
FIG. 11 shows a perspective view the bottom part of the disinfection chamber and of the carbonation chamber of FIGS. 10A and 10B.

Embodiments of a carbonation sub-system assembly 208 are shown in FIGS. 10A, 10B and 11. FIGS. 10A and 10B differ from one another primarily by the inclusion of a cooling jacket 211, being in this embodiment a tightly coiled spiral tube wound around the disinfection chamber 210. Thus, while being disinfected, the water is also cooled. Otherwise the two different embodiments are similar and will be jointly described.

The arrangement 108 comprises a disinfection chamber 210 fed water (typically cooled) through a disinfection chamber inlet 212 fitted with a valve 242 and a disinfection chamber outlet 216. This disinfection sub-system may comprise a disinfection module, such as a disinfecting UV lamp, the base 214 of which can be seen, the lamp being received within the disinfection chamber. Said UV lamp is adapted to irradiate a disinfecting UV radiation on the water contained in chamber 210 to thereby eliminated bacterial contaminants therein. It other embodiments, the UV disinfection sub-system may be separate from the carbonation sub-system, for example fitted on the flow path into or out of the carbonation system; or could be missing altogether.

A carbonation chamber 218, seen also in FIG. 11, is fitted at the bottom of disinfection chamber 210. The disinfection chamber's outlet 216 is in flow communication with carbonation chamber inlet 222 via tubing 220. The carbonation chamber 218 is fitted also with a liquid outlet 226, gas release outlet 228 fitted with a valve 248 (seen in FIG. 10B), a pressurized carbon dioxide inlet 224 associated with a gas valve 244, a safety, excess pressure release valve 230 (which may be omitted in some embodiments) and a liquid level sensor 232. After a quantity of cleaned and/or disinfected liquid is fed into the carbonation chamber, a quantity of pressurized $CO_2$ is introduced into the chamber through the pressurized carbon dioxide inlet 224, to carbonate the liquid. After carbonation, as a result of opening the link between a pressurized $CO_2$ source 300 (which is typically the pressurized $CO_2$ canister 104) and inlet 224 through operation of valve 244, the carbonated liquid egresses from the chamber through the liquid outlet 226, and propelled to the beverage dispensing outlet 110 (see FIG. 1) by the remaining pressure of $CO_2$ gas within the carbonation chamber. After dispensing of the carbonated liquid, excess $CO_2$ pressure still remaining in the carbonation chamber may be relieved through the gas release outlet 228, which may also function as a vent for the carbonation chamber. As can further be seen in FIG. 10A, the carbonation chamber may be associated in at least part of its outer face with a heating element 202, which may be in any form known in the art. The heating element 202 may be operated to prevent over-cooling, i.e. freezing, of the liquid within the carbonation chamber 218 as a result from $CO_2$ expansion.

In order to prevent excess pressure from building up in the carbonation chamber, e.g. in the case of malfunctioning, the chamber may be fitted with a safety pressure valve 230.

The valves are typically controlled by a control unit (not shown), allowing a sequence of operation steps, enabling on-demand preparation of carbonated beverage and, in some embodiments, also selection between dispensing of carbonated and of non-carbonated beverage. The sequence of steps may, for example, include first introducing a quantity of cleaned liquid into the carbonation chamber through the cleaned liquid inlet 222. Then gas valve 244 may be activated to permit entry of pressurized $CO_2$ into the carbonation chamber. Gas valve 244 may then be closed and then, by opening an outlet valve, e.g. at the dispensing outlet, carbonated liquid is propelled out of the carbonation chamber by the pressure remaining in the chamber, out of outlet 226 to the dispensing outlet 110. Prior to complete drainage of carbonated liquid from the carbonation chamber, a small amount of cleaned non-carbonated liquid may be introduced into the chamber in order to wash the reminders of carbonated liquid from the carbonation chamber' walls, as such remainders may impart a bitter taste on a next batch of liquid to be carbonated. Thereafter, gas release valve 248 may be opened to release excess gas pressure to thereby ready the chamber for the next cycle.

Figure 12:
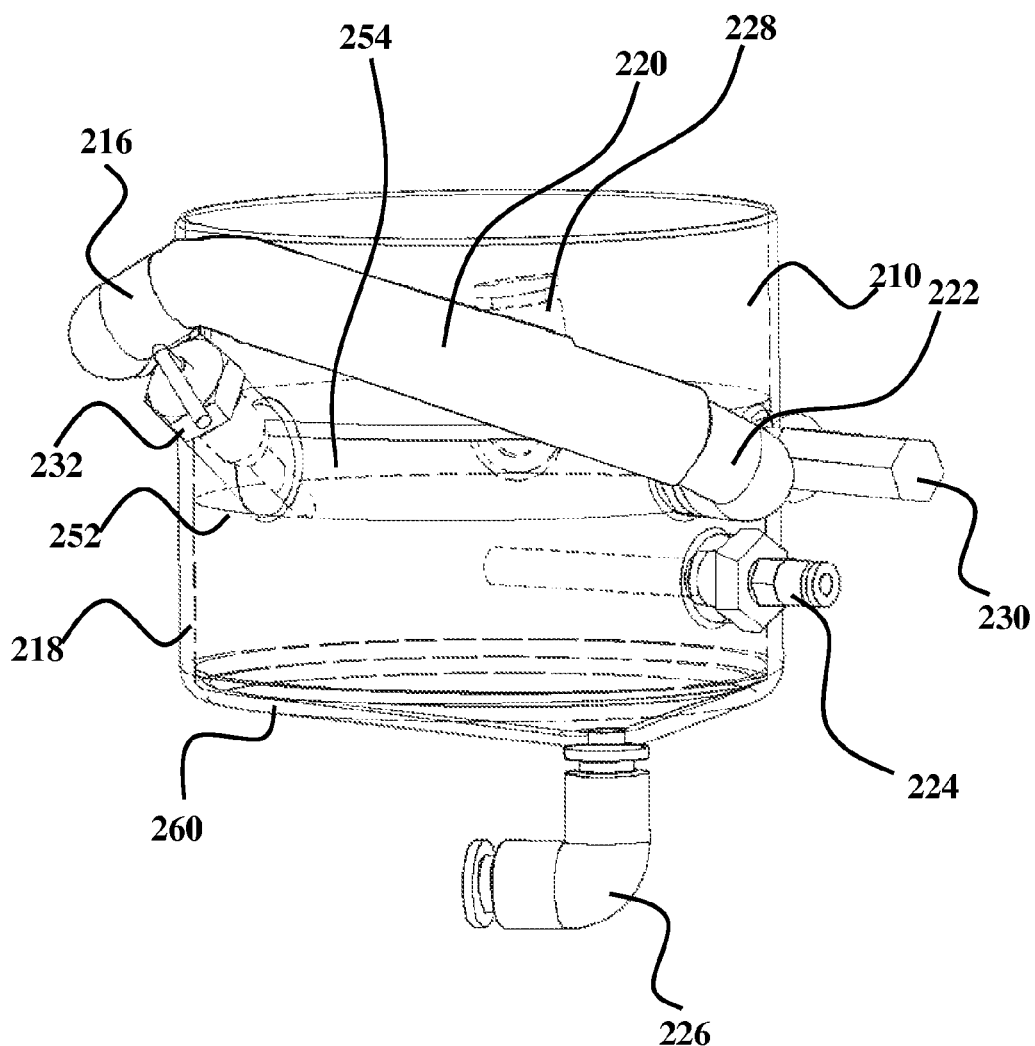
FIG. 12 shows a perspective view of the bottom part of a disinfection chamber and of an associated carbonation chamber according to an embodiment of the invention.

As can be seen in FIG. 12, liquid in carbonation chamber 218 fills the chamber up to a level 252 defined by the liquid level sensor 232, leaving an overhead space 254. In order to fill the carbonation chamber, valve 242 is opened and the liquid entering chamber 210 displaces the same quantity of liquid into carbonation chamber 218. Once the liquid level reaches level 252, through a closed loop control mechanism valve 242 shuts off the flow into the disinfection chamber and hence from there into the carbonation chamber.

This overhead space 254 provides some tolerance in case of small increase in the volume of the liquid during carbonation. In addition, the safety pressure valve 230 is positioned so as to open into the overhead space such that in a case of excess pressure, e.g. cause by a malfunction, the excess pressure may be released by the safety pressure valve.

In some embodiments, a user may be able to select between the dispensing of carbonated beverage and the dispensing of non-carbonated beverage. By one embodiment, demand of non-carbonated beverage may cause cleaned liquid to pass through the carbonation chamber without opening of valve 244 (which would otherwise carbonate the liquid). Alternatively, a bypass conduit to the carbonation chamber may be provided to permit flow of cleaned liquid to the dispensing outlet without passage through the carbonation chamber.

FIG. 12 shows another embodiment of the carbonation chamber. In this embodiment, the carbonated liquid outlet 226 is positioned at a bottom wall 260 of the carbonation chamber 218. The bottom wall 260 is downwardly inclined towards the outlet, enabling better drainage of remaining carbonated liquid out of the chamber. This configuration enables efficient drainage of any carbonated liquid which may be left in the carbonation chamber after the carbonated liquid has been dispensed.

Figure 13:
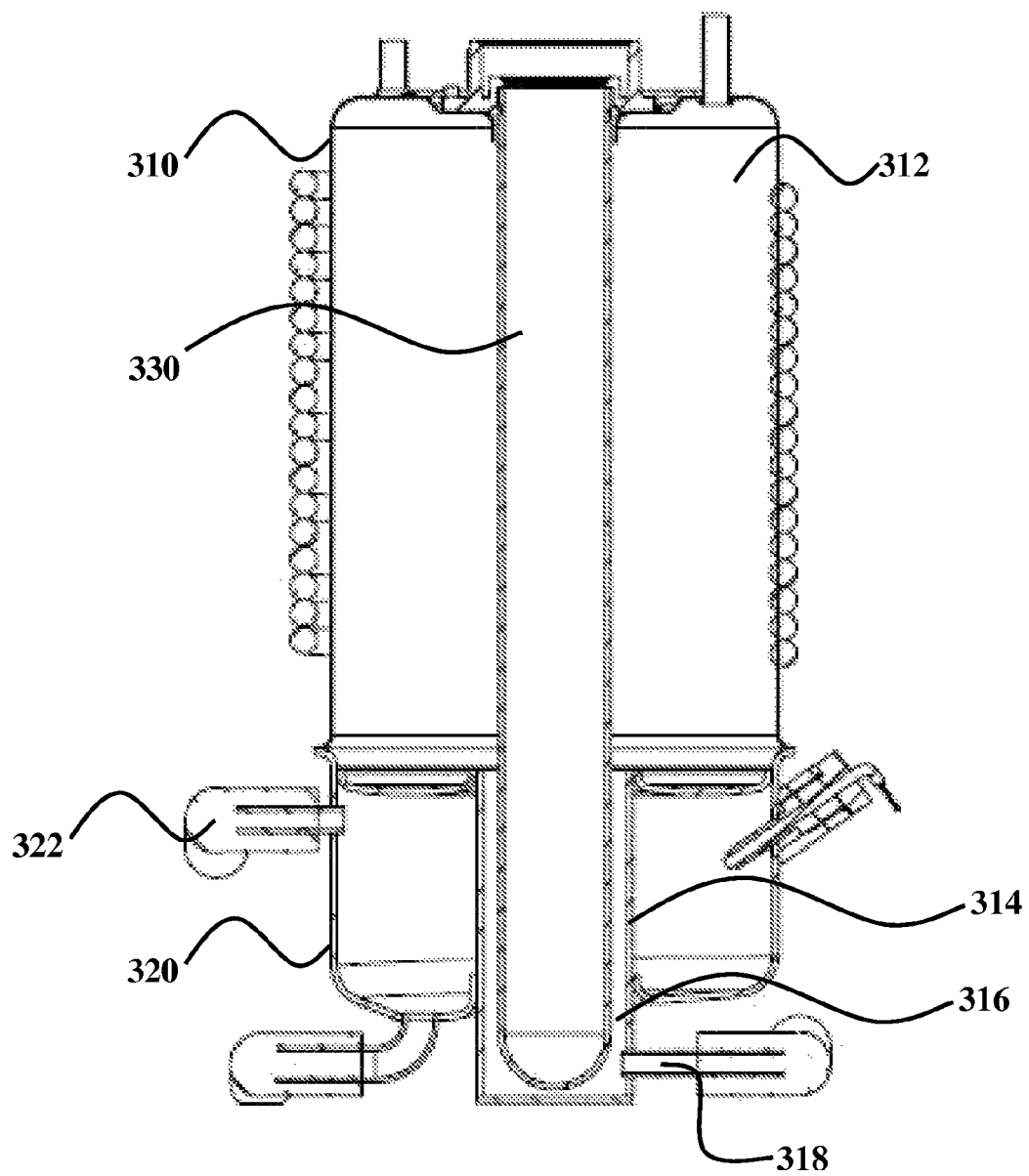
FIG. 13 is a perspective view of a carbonation sub-system with an associated liquid disinfection chamber according to an embodiment of the invention.

In the embodiment shown in FIG. 13, the disinfection chamber 310 and the carbonation chamber 320 are integrally formed with one another into one liquid treatment arrangement. In this arrangement, the disinfection chamber has a first, broad portion 312 and a second, narrow portion 314 formed at its bottom and defining a lumen 316. The narrow portion 314 extends into the carbonation chamber, and is therefore enveloped by it. Such an arrangement affords for a compact spatial configuration of the treatment arrangement within beverage dispenser.

In this embodiment, the disinfection chamber includes a disinfecting UV light source 330 (of which only the external envelope is represented), having typically the general shape of an elongated tube, the bottom end of which being accommodated within the lumen 316. An outlet 318 of the disinfection chamber is being formed at the bottom of said lumen, and in fluid communication with the liquid inlet 322 of the carbonation chamber through a flow line (not shown). In this manner, the egressing liquid flows along the bottom portion of the UV light source and this close proximity of the flowing liquid to the UV light source provides for proper disinfection. It should be noted that in some embodiment the UV light source may be accommodated within a UV light-transparent sleeve having general contours tracing those of the UV light source 330.

Figure 14:
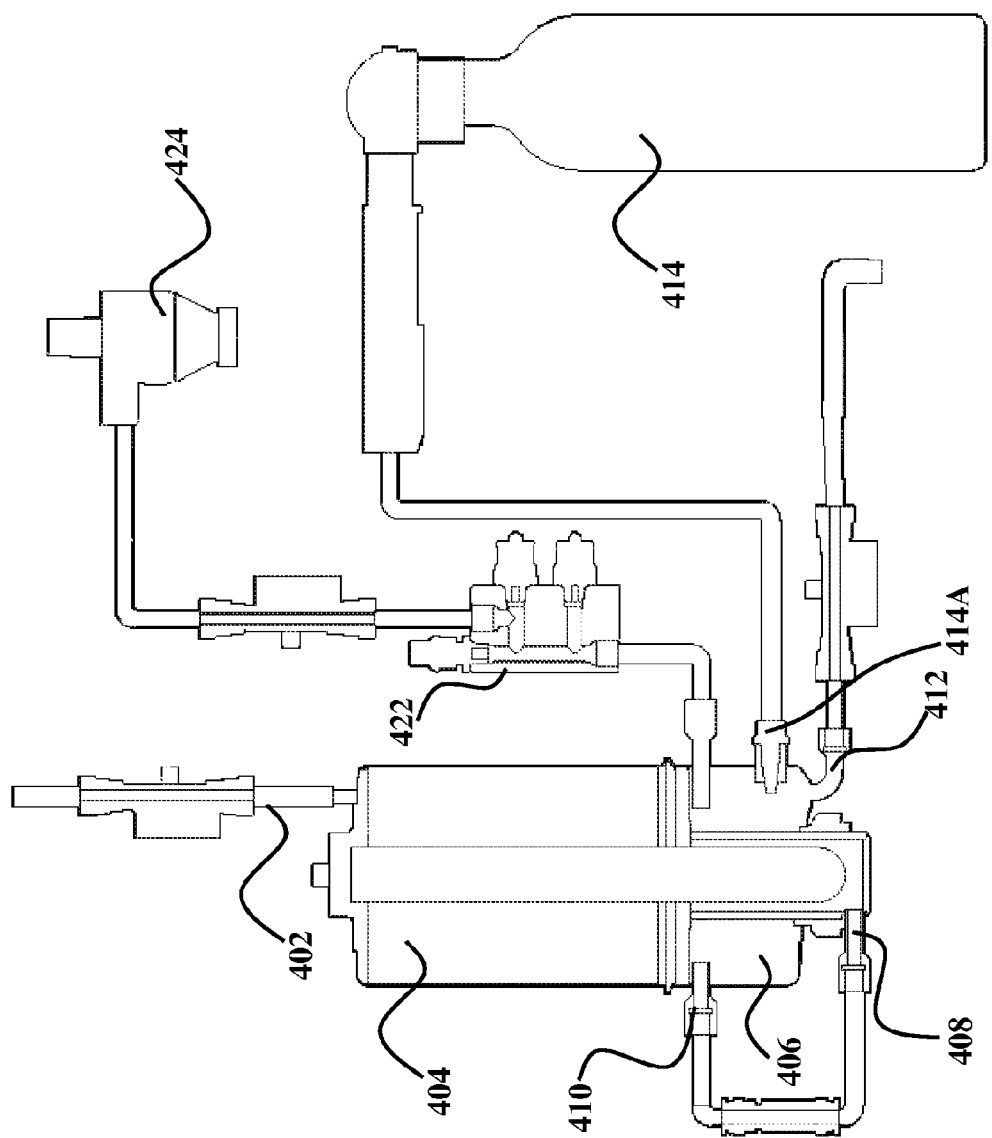
FIG. 14 is a schematic representation of system elements and liquid flow lines according to an embodiment of the pressure-release aspect.

A schematic representation of system elements and liquid flow paths according to an embodiment of the pressure-release aspect is shown in FIG. 14. Water is fed into the disinfection chamber 404 through liquid inlet 402. The disinfection is typically by UV radiation. From there the water is fed through disinfected liquid outlet 408 into carbonation chamber 406 via inlet 410. If no carbonation is intended, cleaned and disinfected water is dispensed through the carbonation chamber without being carbonated, out of dispensing outlet 412 towards the dispenser's beverage outlet. If carbonation operation is initiated, $CO_2$ is fed into the carbonation chamber from $CO_2$ canister 414 through $CO_2$ inlet 414A, thereby carbonating the quantity of liquid within the carbonation chamber. Upon completion of the carbonation, valve 421 is opened to permit flow of gas through pressure regulator 422 to thereby reduce the pressure within the chamber to a desired residual pressure, defied by the pressure regulator. The gas released from the chamber may carry droplets or aerosol of water, which are separated from the gas by a cyclone module 424. The water separated by the cyclone is channeled to a liquid collector (not shown). After a desired pressure is obtained in the carbonation chamber, carbonated liquid is allowed to be dispensed through outlet 412 by the residual $CO_2$ gas pressure, and propelled towards the dispenser's outlet.

Figure 15:
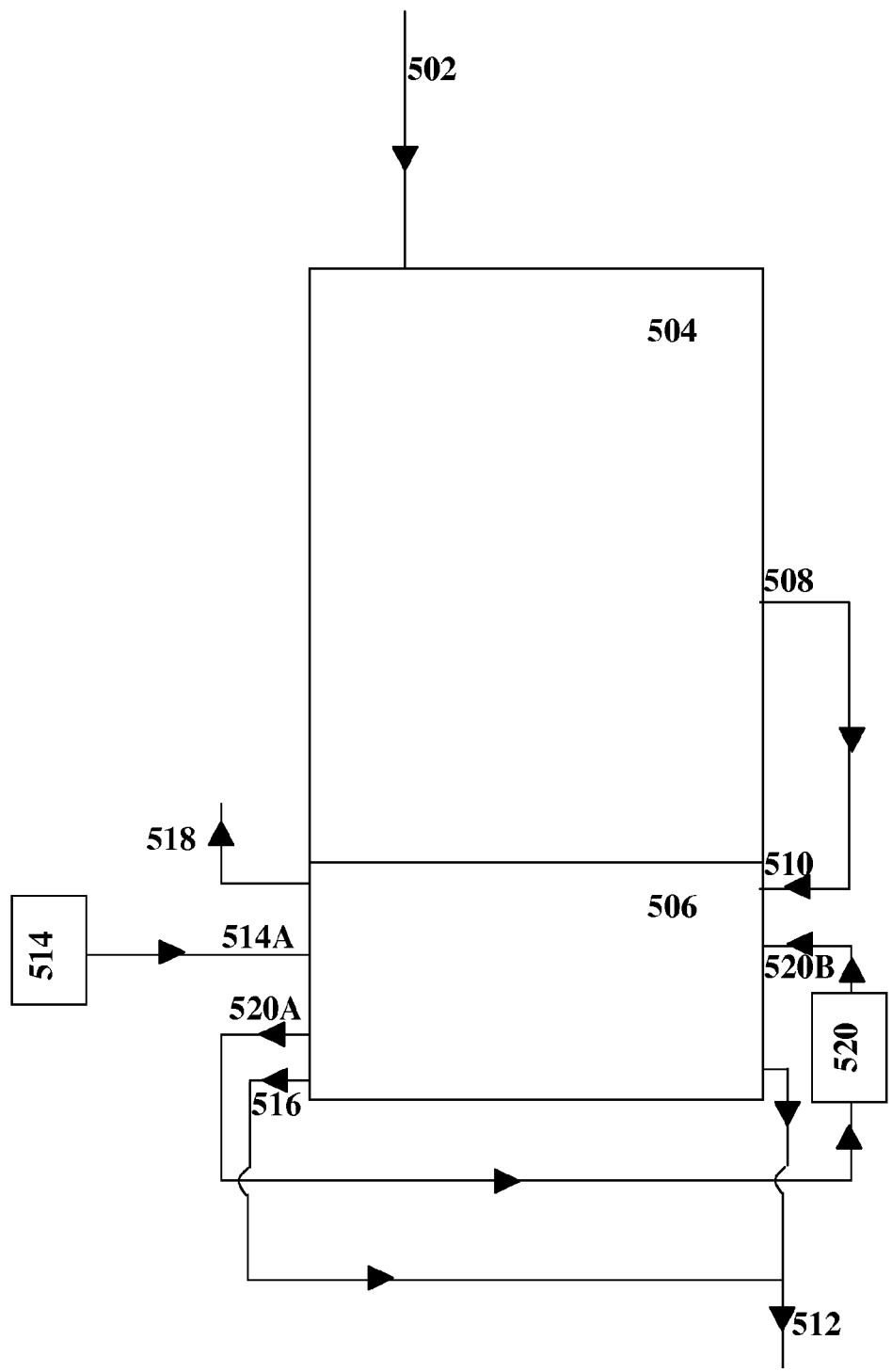
FIG. 15 is a schematic representation of system elements and liquid flow lines according to an embodiment of the circulation pump aspect.

A schematic representation of system elements and water flow paths according to an embodiment of the circulation pump aspect is shown in FIG. 15. Water is fed into the disinfection chamber 504 through liquid inlet 502. After disinfection, e.g. by UV radiation, liquid is fed through disinfected liquid outlet 508 into carbonation chamber 506 via inlet 510. If no carbonation is desired, cleaned and disinfected liquid is dispensed through the carbonation chamber without being carbonated, out of dispensing outlet 512 towards the dispenser's beverage outlet. If carbonation operation is initiated, $CO_2$ is fed into the carbonation chamber from $CO_2$ canister 514 through $CO_2$ inlet 514A, thereby carbonating the quantity of liquid within the carbonation chamber. Upon completion of the carbonation, the carbonated liquid is dispensed through outlet 516 by the residual $CO_2$ gas pressure, and propelled towards the dispenser's outlet. After drainage of the carbonation chamber, vent 518 is opened to thereby release excess $CO_2$ from the carbonation chamber, and allowing a new quantity of liquid to be fed into the carbonation chamber. Optionally, a circulation pump 520 may be used during the carbonation process in order to enable reduction of $CO_2$ pressure used in order to achieve a desired carbonation level. Circulation pump 520 may be operated at the same time liquid is being carbonized, upon which liquid is circulated between circulation outlet 520A and circulation inlet 520B. Upon completion of carbonation, the operation of pump 520 is stopped, the carbonated liquid is propelled towards the dispensing outlet by the excess pressure of $CO_2$ in the carbonation chamber, vent 518 is opened, and the system is operative to begin a new cycle of operation.

The invention claimed is:

1. A beverage dispensing apparatus, comprising;
    a liquid flow system defining a liquid flow path between an aqueous liquid source and a beverage dispensing outlet;
    a liquid carbonation sub-system for impregnating the liquid with carbon dioxide and comprising a carbonation chamber linked to the liquid flow system for receiving a quantity of liquid from said source and being associated with a source of carbon dioxide for carbonating said quantity while in said chamber;
    a beverage dispensing outlet linked to said chamber; and
    a pressure-lowering utility operative after carbonation of the water in said chamber and prior to dispensing of the carbonated water for reducing the carbon dioxide pressure in the carbonation chamber, the pressure-lowering utility comprising a pressure-reducing regulator in gas communication with said chamber and a module for separating between released gas and liquid droplets carried by the released gas, and configured to either circulate the liquid separated from the gas back into the liquid flow system or drain the liquid into a drainage.

2. The beverage dispensing apparatus of claim 1, wherein the carbonated beverage is dispensed out of the dispensing outlet by carbon dioxide pressure in the chamber.

3. The apparatus of claim 1, comprising a dispensing outlet for dispensing both non-carbonated and carbonated beverage.

4. The apparatus of claim 1, comprising a control system permitting to dispense either a quantity of carbonated beverage or a quantity of non-carbonated beverage.

5. The apparatus of claim 4, comprising a chamber bypass conduit with associated water flow control element for feeding, upon demand, non-carbonated liquid from the source directly to the dispensing outlet.

6. The apparatus of claim 4, whereupon demand for non-carbonated beverage, liquid flows through the carbonation chamber without activation of the carbonation sub-system.

7. The apparatus of claim 1, comprising a liquid cleaning sub-system disposed in the liquid flow system for removing contaminants from the liquid and for feeding cleaned liquid to the carbonation chamber.

8. The apparatus of claim 7, wherein the liquid cleaning sub-system comprises at least one of a filtration unit or a disinfection sub-system for filtering and/or disinfecting the liquid before its introduction into the chamber.

9. The apparatus of claim 8, wherein the disinfection sub-system comprises a disinfection chamber linked to the carbonation chamber, and wherein each of the disinfection chamber and the carbonation chamber comprises a liquid inlet and a liquid outlet; the liquid outlet of the disinfection chamber being connected to the liquid inlet of the carbonation chamber.

10. The apparatus of claim 9, wherein the disinfection chamber and the carbonation chamber are attached to one another, with an upper face of the carbonation chamber being associated with a bottom face of the disinfection chamber.

11. The apparatus of claim 10, wherein the disinfection chamber and the carbonation chamber are integrally formed.

12. The apparatus of claim 9, wherein the liquid outlet of the carbonation chamber is positioned at a bottom wall of the carbonation chamber, said wall being downwardly inclined towards said outlet.

13. The apparatus of claim 1, wherein the carbon dioxide source is a pressurized CO2 canister.

14. The apparatus of claim 13, wherein the canister is connected to the system by a connector that is configured for swiveling between a use state and an attachment/detachment state of the canister.

15. The apparatus of claim 14, wherein the connector is linked to linking element having the capability of rotational movement of one end thereof, linked to the connector, with respect to the other end that is fixed to the system.

16. The apparatus of claim 15, wherein the connector and the linking element jointly define a duct for a gas flow from the canister to the carbon dioxide inlet.

\* \* \* \* \*